J. W. GRANTLAND.
WATER LEVEL GAUGE.
APPLICATION FILED APR. 24, 1920.
1,428,162.
Patented Sept. 5, 1922.
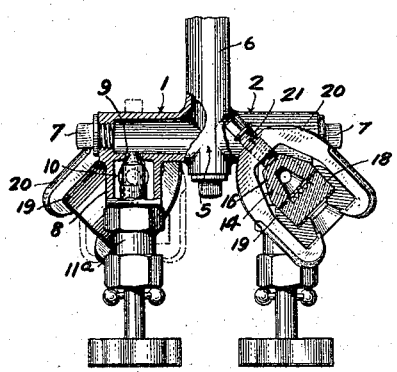
Fig. 2.
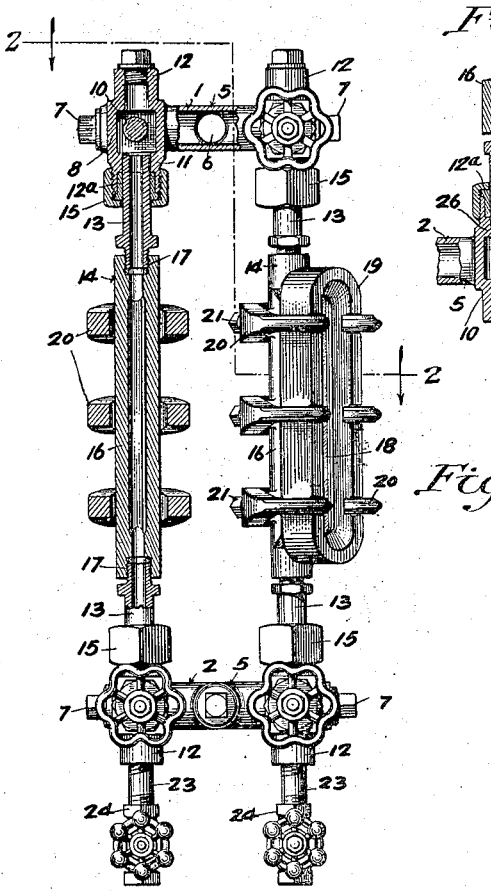
Fig. 4.
Fig. 1.
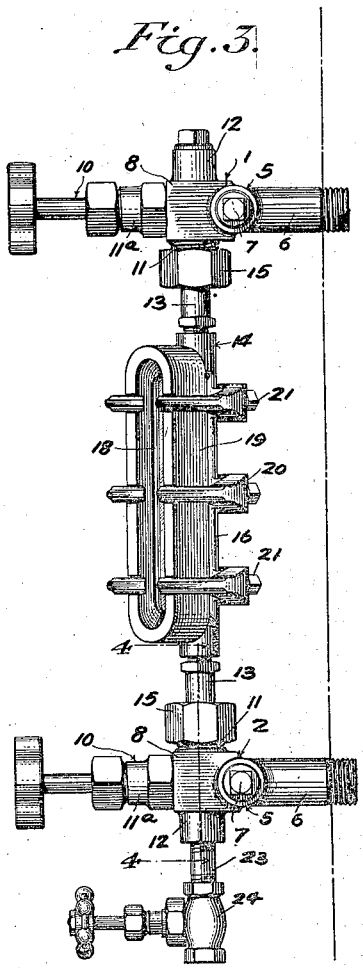
Fig. 3.
Witness
Francis E. Alden.
Inventor:
John W. Grantland.
By Word & Word
Attorneys Patented Sept. 5, 1922.

1,428,162

UNITED STATES PATENT OFFICE.

JOHN W. GRANTLAND, OF CINCINNATI, OHIO.

WATER-LEVEL GAUGE.

Application filed April 24, 1920. Serial No. 376,405.

*To all whom it may concern:*

Be it known that I, JOHN W. GRANTLAND, a citizen of the United States, and residing at Cincinnati, in the county of Hamilton and State of Ohio, have invented a new and useful Improvement in Water-Level Gauges, of which the following specification is a full disclosure.

My invention relates to water gauges for locomotive boilers, particularly of a type commercially known as "Reflex water gauges," in which the water level vision is had through a heavy glass having its interior or rear side longitudinally grooved, the plate providing a closure for an open sided hollow body member to which the plate is clamped, and my improvement is especially designed to render a water level reading from several directions or vantage positions, desirable to enable both the engineer and fireman or attendants to conveniently view the gauge or gauges for ascertaining the boiler water level from their respective stations in the cab.

An object of my invention is to provide an arrangement of a plurality of water gauges, so constructed as to allow for angular adjustment with respect to each other, so that the sight glass of each is set to a most suitable water level reading position.

Another object is to so construct the feed channels that the water supply is delivered equally and constantly to both gauge chambers; and a further object is to provide for independent control of gauge units as for cutting off the bottom connections to each or both of the gauge chambers, independently of each other, as in the case of breakage of the glass or glasses.

Other objects and advantages will be set forth in the description and claims, and special reference is made to the drawings, forming a part of this specification in which;

Fig. 1 is a front elevation, one side being shown in section.

Fig. 2 is a plan section on the line 2—2 of Fig. 1.

Fig. 3 is a side elevation, and

Fig. 4 is a section on line 4—4 of Fig. 3, illustrating the pivoting of the lower foot of the gauge-chamber.

Upper and lower T-shaped distributing heads or manifolds 1 and 2 provide opposite supports for the water gauges connected therebetween. The heads or manifolds, upper and lower, are of duplicate construction and thus interchangeable, and therefore, a description of one will answer for both.

Each manifold comprises a conduit body 5 having a central lateral nipple extension 6 which taps or connects to the boiler. The conduit body 5 has open opposite ends into which the closure plugs 7 are secured. Valve casings 8, 8, extend integral from one side of the body and preferably at opposite ends thereof, each communicating with the passage 9 of the body 5, and extending at right angles to the axis of the body passage, and the stem of a valve 10 has a threaded engagement with and extends through a bonnet 11ª threaded to the valve casing 8 of the body. Each valve casing has a pair of nipples 11, 12, extending vertically from opposite sides of the casing, with the lower or downwardly extended nipple 11 counterbored to provide a socket for a connecting tube 13 telescoped therein, and a packing gland 12ª surrounding the tube. The connecting tube has a threaded connection with the one end of the gauge body 14, is free to swivel within the socket of the nipple 10, and is sustained under a water-tight joint or connection by a packing nut 15, exteriorly threaded upon the nipple 11 and engaging and compressing the packing gland between the nipple and tube.

The water gauge comprises an elongated open faced casing 16, having at its opposite ends threaded sockets 17, 17, to receive the top and bottom tubes 13. The front face of the casing 16 is provided with an elongated sight aperture, which is covered by a heavy plate of glass 18, seating against the exterior face of the casing, and an appropriate packing is interposed between said glass and casing face for making a water and steam tight joint when the glass is clamped to the casing. The glass is clamped to the casing by a frame 19 engaged over the sides of the glass and overlapping the sides of the casing, the frame being clamped to the casing by a plurality of suitably spaced clamp yokes 20, each yoke having jaw ends engaging the frame at opposite sides of its front face and straddling the rear of the casing and engaging with the rear of the casing centrally by a set screw 21 threaded through the yoke.

To facilitate the reading of the water level height in the passage or chamber formed by the casing and glass, the glass may have the usual facets on its rear face to intensify the water level line, so as to be more distinctly clear and legible.

The gauge construction may be of various commercial types, preferably of this class, having observation through an elongated frame sight opening.

As shown in Fig. 4, the valve casing nipple 11 of the lower manifold is counterbored to provide a shoulder 26, upon which the connector tube rests, and prevents the gauge unit from being moved descendingly through any swivelling movement in making an angular adjustment.

With the foregoing exemplification of the details of construction of the various parts, it will now be recognized that the improvement consists of the upper and lower distributing heads or manifolds 1, 2, respectively, each manifold having a plurality of valve controlled outlets, each carrying a swivelled connector tube and common inlet for the combined outlets, and a gauge connected between the swivelled connector tube of the corresponding outlets of the upper and lower manifolds. The upper and lower manifolds are interchangeable, which is of material advantage in the manufacture and in making repairs and for the trade reduces the number of different parts required to be carried in stock.

A water level gauge or sight member is provided for each of the outlet branches of the manifold and the construction as illustrated may be referred to as "duplex" type, although it is obvious that the number of sight members may be increased if occasion demands.

Each sight member may be independently swivelled with its connector tube within the corresponding valve controlled branches of the upper and lower manifolds, allowing it to be swung to various angular adjustments, and one sight member or unit relatively to a second, so that a water column or level reading may be conveniently made by several attendants stationed at opposite positions relatively of the gauges.

The engineer and fireman both can conveniently view the gauge while occupying their seats at opposite sides of the engine cab, and either one or both of them may adjust their designated gauges to any angle most desirable to him independent of the other. Each sight member or unit can be independently removed, by closing the upper and lower manifold gauge valves for the unit, for renewing a broken glass or making repairs, and the one remaining intact may be used alone for water level reading during such emergency.

The nipple extensions 11 of the valve casing of the lower manifold are each provided with a pipe extension 23 and valve 24 for draining the gauge unit with which they communicate.

Having described my invention, I claim:

In a device of the class described, a pair of water level gauges arranged side by side, each gauge comprising a casing, providing a longitudinal sight chamber and sight opening, a glass plate providing a closure for the casing opening, means for clamping the glass plate to the casing, said casing having nipples at its opposite ends, a tubular extension connecting with the casing upper nipple, and a tubular extension connecting with the casing lower nipple, T-shaped manifolds for respectively connecting the opposite ends of said water gauges and supporting the gauges side by side, each manifold at its opposite ends and forward side provided with a hollow valve body portion in communication with the conduit of the manifold, and each valve body portion provided with oppositely disposed nipple extensions at opposite sides of the body portion and transverse to the manifolds, one thereof connecting with a respective tubular extension of one of said gauges, pipe union coupling means for securing a tubular extension to a respective manifold nipple extension, and the parts providing a pivot for swinging the gauge, and a valve for each valve body of said manifolds.

In witness whereof, I hereunto subscribe my name, as attested by the two subscribing witnesses.

JOHN W. GRANTLAND.

Witnesses:
 FRANCIS E. ALDEN,
 L. A. BECK.